United States Patent
Brueck et al.

(10) Patent No.: US 12,323,948 B2
(45) Date of Patent: Jun. 3, 2025

(54) DETECTION OF REFERENCE SIGNALS AND GATING OF REFERENCE SIGNAL PROCESSING

(71) Applicant: QUALCOMM Incorporated, San Diego, CA (US)

(72) Inventors: Stefan Brueck, Neunkirchen am Brand (DE); Christian Sgraja, Ehingen (DE); Pierpaolo Vallese, Nuremberg (DE); Peter Zillmann, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 17/647,923

(22) Filed: Jan. 13, 2022

(65) Prior Publication Data

US 2022/0231804 A1    Jul. 21, 2022

Related U.S. Application Data

(60) Provisional application No. 63/138,144, filed on Jan. 15, 2021.

(51) Int. Cl.
*H04L 5/00* (2006.01)
*H04W 8/22* (2009.01)
(Continued)

(52) U.S. Cl.
CPC ........... *H04W 72/02* (2013.01); *H04L 5/0007* (2013.01); *H04L 5/0042* (2013.01); *H04L 5/0048* (2013.01); *H04L 5/0085* (2013.01); *H04W 8/22* (2013.01); *H04W 24/10* (2013.01); *H04W 72/0446* (2013.01); *H04W 72/0453* (2013.01); *H04W 72/23* (2023.01); *H04W 72/51* (2023.01); *H04W 84/02* (2013.01); *H04W 88/02* (2013.01);
(Continued)

(58) Field of Classification Search
CPC ...... H04B 17/0082–409; H04J 11/0023–0093; H04J 2011/0003–0096; H04L 5/0001–26; H04L 27/0002–389; H04W 8/22–245; H04W 16/14–16; H04W 24/02–10; H04W 36/0005–385; H04W 48/02–20; H04W 56/0005–0095; H04W 72/02–569; H04W 74/002–0891; H04W 84/02–16; H04W 88/02–12; H04W 92/02–04; H04W 92/10
See application file for complete search history.

(56) References Cited

U.S. PATENT DOCUMENTS

| 2017/0134128 A1* | 5/2017 | Opshaug | H04L 5/0048 |
| 2021/0013941 A1* | 1/2021 | Sun | H04L 5/0051 |
| 2021/0014791 A1* | 1/2021 | Freda | H04L 5/0053 |

OTHER PUBLICATIONS

International Search Report and Written Opinion—PCT/US2022/070200—ISA/EPO—May 2, 2022.
(Continued)

*Primary Examiner* — Timothy J Weidner
(74) *Attorney, Agent, or Firm* — Harrity & Harrity, LLP

(57) ABSTRACT

Various aspects of the present disclosure generally relate to wireless communication. In some aspects, a user equipment (UE) may detect whether a reference signal is present in a channel at a time instance at which the reference signal is expected. The UE may selectively gate processing of the
(Continued)

reference signal based on detecting whether the reference signal is present in the channel. Numerous other aspects are described.

30 Claims, 9 Drawing Sheets

(51) Int. Cl.
    *H04W 24/10*     (2009.01)
    *H04W 72/02*     (2009.01)
    *H04W 72/0446*     (2023.01)
    *H04W 72/0453*     (2023.01)
    *H04W 72/23*     (2023.01)
    *H04W 72/51*     (2023.01)
    *H04W 84/02*     (2009.01)
    *H04W 88/02*     (2009.01)
    *H04W 88/08*     (2009.01)
    *H04W 92/02*     (2009.01)
    *H04W 92/10*     (2009.01)
(52) U.S. Cl.
    CPC ............ *H04W 88/08* (2013.01); *H04W 92/02* (2013.01); *H04W 92/10* (2013.01)

(56) References Cited

OTHER PUBLICATIONS

LG Electronics: "Remaining Issues of DL Signals and Channels for NR-U", 3GPP Draft, 3GPP TSG RAN WG1 #100bis, R1-2001933, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020 Apr. 10, 2020 (Apr. 10, 2020), XP051873370, 9 Pages, Retrieved from the Internet: URL: https://ftp.3gpp.org/tsg_ran/WG1_RL1/TSGR1_100b_e/Docs/R1-2001933.zip R1-2001933.docx [retrieved on Apr. 10, 2020] Section 4.

Moderator, (NTT Docomo et al.,)"Summary on [101-e-Post-NR-UE-Features-01]", 3GPP Draft, 3GPP TSG RAN WG1 #101, R1-2005105, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020 Jun. 11, 2020 (Jun. 11, 2020), XP051897019, pp. 1-13, Retrieved from the Internet: URL: https://ftp.3gpp.org/tsg_ran/WG1_RL1/TSGR1_101-e/Docs/R1-2005105.zipR1-2005105_Summary on 101-e-Post-NR-UE-Features-01_final.docx [retrieved on Jun. 11, 2020] p. 1-p. 4.

\* cited by examiner

DETECTION OF REFERENCE SIGNALS AND GATING OF REFERENCE SIGNAL PROCESSING

CROSS-REFERENCE TO RELATED APPLICATION

This patent application claims priority to U.S. Provisional Patent Application No. 63/138,144, filed on Jan. 15, 2021, entitled "DETECTION OF REFERENCE SIGNALS AND GATING OF REFERENCE SIGNAL PROCESSING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for detection of reference signals and gating of reference signal processing in an unlicensed spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes detecting whether a reference signal is present in a channel at a time instance at which the reference signal is expected; and selectively gating processing of the reference signal based on detecting whether the reference signal is present in the channel.

In some aspects, a UE for wireless communication includes a memory and one or more processors coupled to the memory, the one or more processors configured to: detect whether a reference signal is present in a channel at a time instance at which the reference signal is expected; and selectively gate processing of the reference signal based on detecting whether the reference signal is present in the channel.

In some aspects, a non-transitory computer-readable medium storing a set of instructions for wireless communication includes one or more instructions that, when executed by one or more processors of a UE, cause the UE to: detect whether a reference signal is present in a channel at a time instance at which the reference signal is expected; and selectively gate processing of the reference signal based on detecting whether the reference signal is present in the channel.

In some aspects, an apparatus for wireless communication includes means for detecting whether a reference signal is present in a channel at a time instance at which the reference signal is expected; and means for selectively gating processing of the reference signal based on detecting whether the reference signal is present in the channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
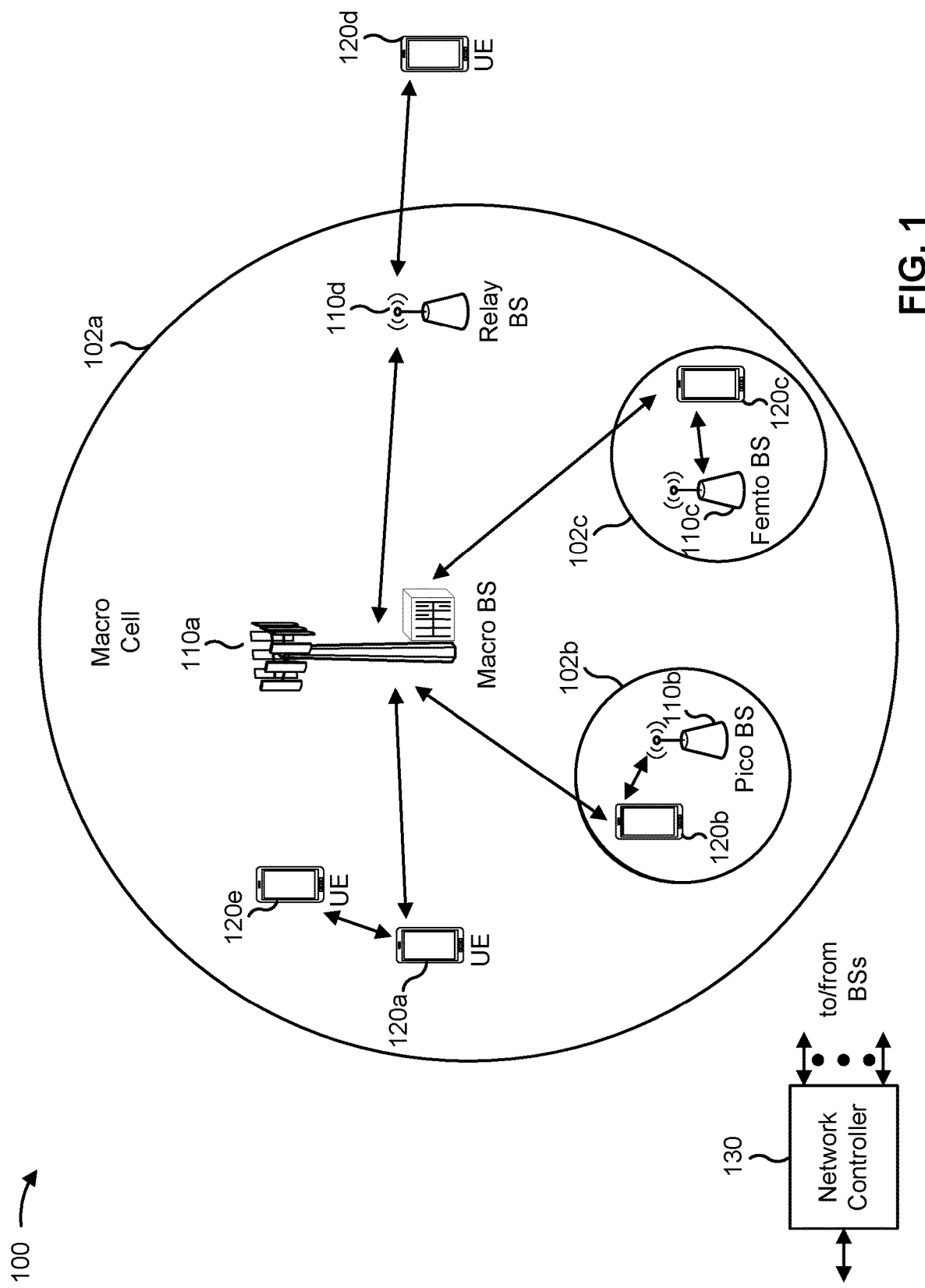
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4*a* or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-*a* or FR4-1, and/or FR5, or may be within the EHF band. It is contemplated that the frequencies included in these operating bands (e.g., FR1, FR2, FR3, FR4, FR4-*a*, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
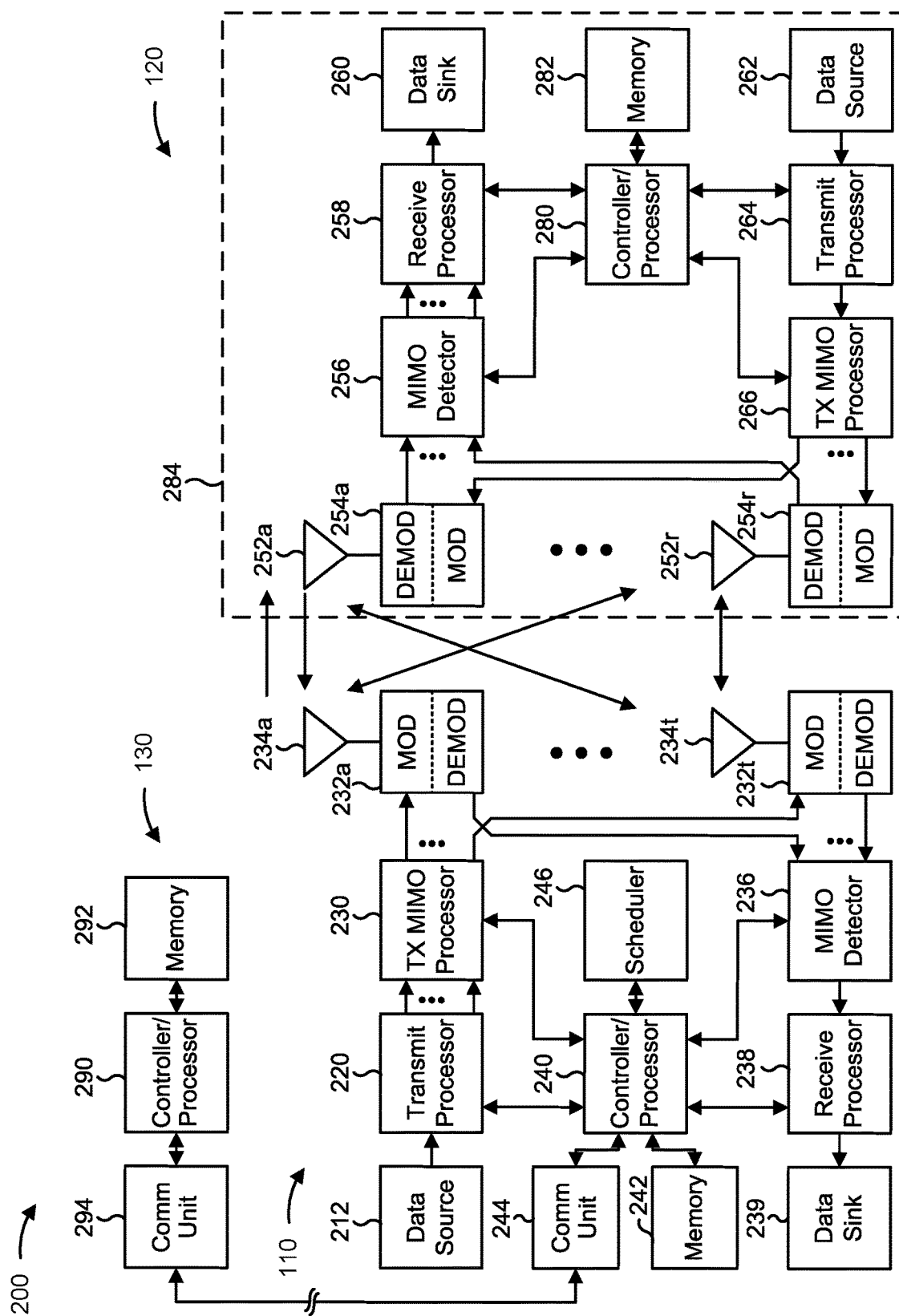
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9.)

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9.)

The controller/processor 240 of the base station 110, the controller/processor 280 of the UE 120, and/or any other component(s) of FIG. 2 may perform one or more techniques associated with detection of reference signals and gating of reference signal processing in an unlicensed spectrum, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for detecting whether a reference signal is present in a channel at a time instance at which the reference signal is expected; and/or means for selectively gating processing of the reference signal based on detecting whether the reference signal is present in the channel. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for detecting whether the reference signal is present in the channel based at least in part on comparing a signal measurement on at least a sub-band of the channel with a threshold.

In some aspects, the UE 120 includes means for detecting whether the reference signal is present in the channel in a time domain at the time instance at which the reference signal is expected.

In some aspects, the UE 120 includes means for measuring a signal measurement on the channel in the time domain; and/or means for comparing the signal measurement on the channel in the time domain with a time domain signal measurement threshold.

In some aspects, the UE 120 includes means for gating processing of the reference signal completely for an occurrence of the reference signal associated with the time instance at which the reference signal is expected based at least in part on detecting that the reference signal is not present in the channel in the time domain.

In some aspects, the UE 120 includes means for detecting whether the reference signal is present in a frequency domain in each of a plurality of sub-bands in the channel.

In some aspects, the UE 120 includes means for measuring a respective signal measurement in the frequency domain on each of the plurality of sub-bands; and/or means for comparing the respective signal measurement in the frequency domain on each of the plurality of sub-bands with a frequency domain signal measurement threshold.

In some aspects, the UE 120 includes means for gating processing of the reference signal completely for an occurrence of the reference signal associated with the time instance at which the reference signal is expected based at least in part on detecting that the reference signal is not present in the frequency domain in at least one sub-band of the plurality of sub-bands.

In some aspects, the UE 120 includes means for processing the reference signal using portions of the reference signal in one or more sub-bands in which the reference signal is present in the frequency domain based at least in part on detecting that the reference signal is not present in the frequency domain in at least one sub-band of the plurality of sub-bands.

In some aspects, the UE 120 includes means for detecting whether the reference signal is present in the channel in a time domain at the time instance at which the reference signal is expected; and/or means for detecting, based at least in part on a determination that the reference signal is present in the channel in the time domain, whether the reference signal is present in a frequency domain in each of a plurality of sub-bands in the channel.

In some aspects, the UE 120 includes means for gating processing of the reference signal for an occurrence of the reference signal associated with the time instance at which the reference signal is expected based on detecting that the reference signal is not present in the channel.

In some aspects, the UE 120 includes means for preventing, for a filter having a filter value that is based at least in part on processing the reference signal, a current value of the filter value from changing based on processing the occurrence of the reference signal associated with the time instance at which the reference signal is expected.

In some aspects, the UE 120 includes means for receiving, from a base station prior to the time instance at which the reference signal is expected, an indication that schedules the time instance at which the reference signal is expected.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
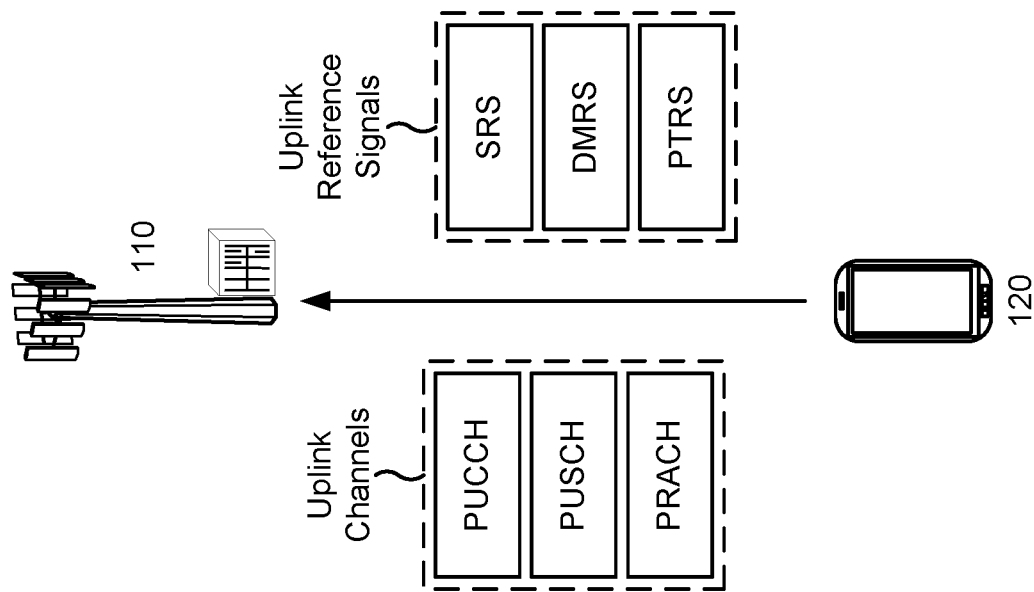
FIG. 3 is a diagram illustrating an example of physical channels and reference signals in a wireless network, in accordance with the present disclosure.
Figure 3:
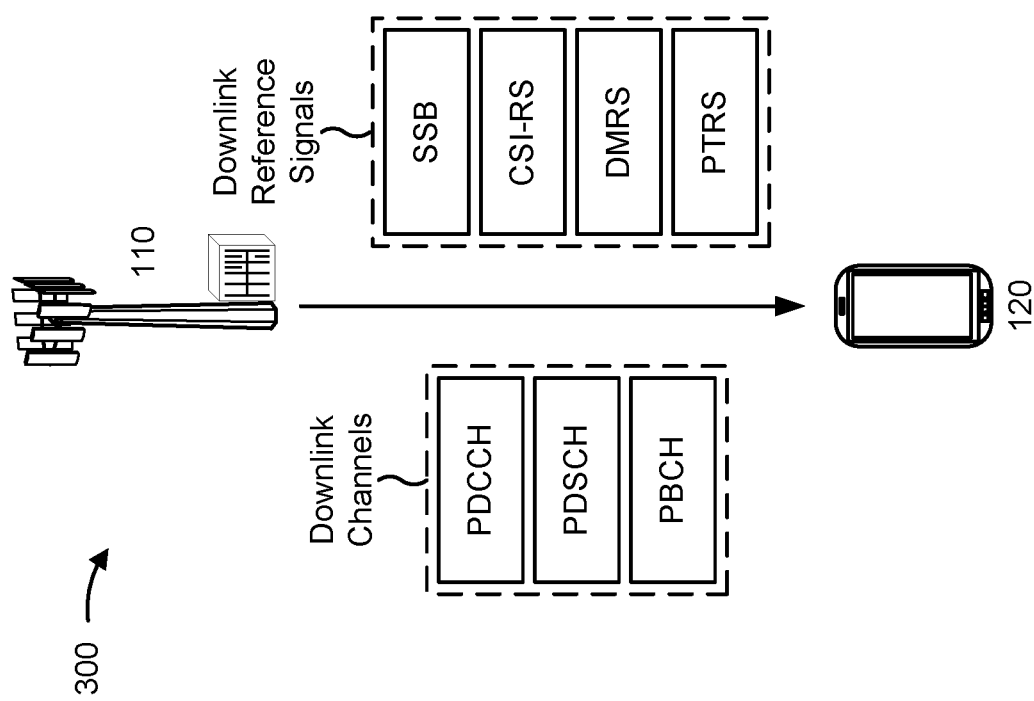

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples. A tracking reference signal (TRS) may carry information used for time and frequency tracking by the UE 120. A TRS may be configured using a particular CSI-RS configuration.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
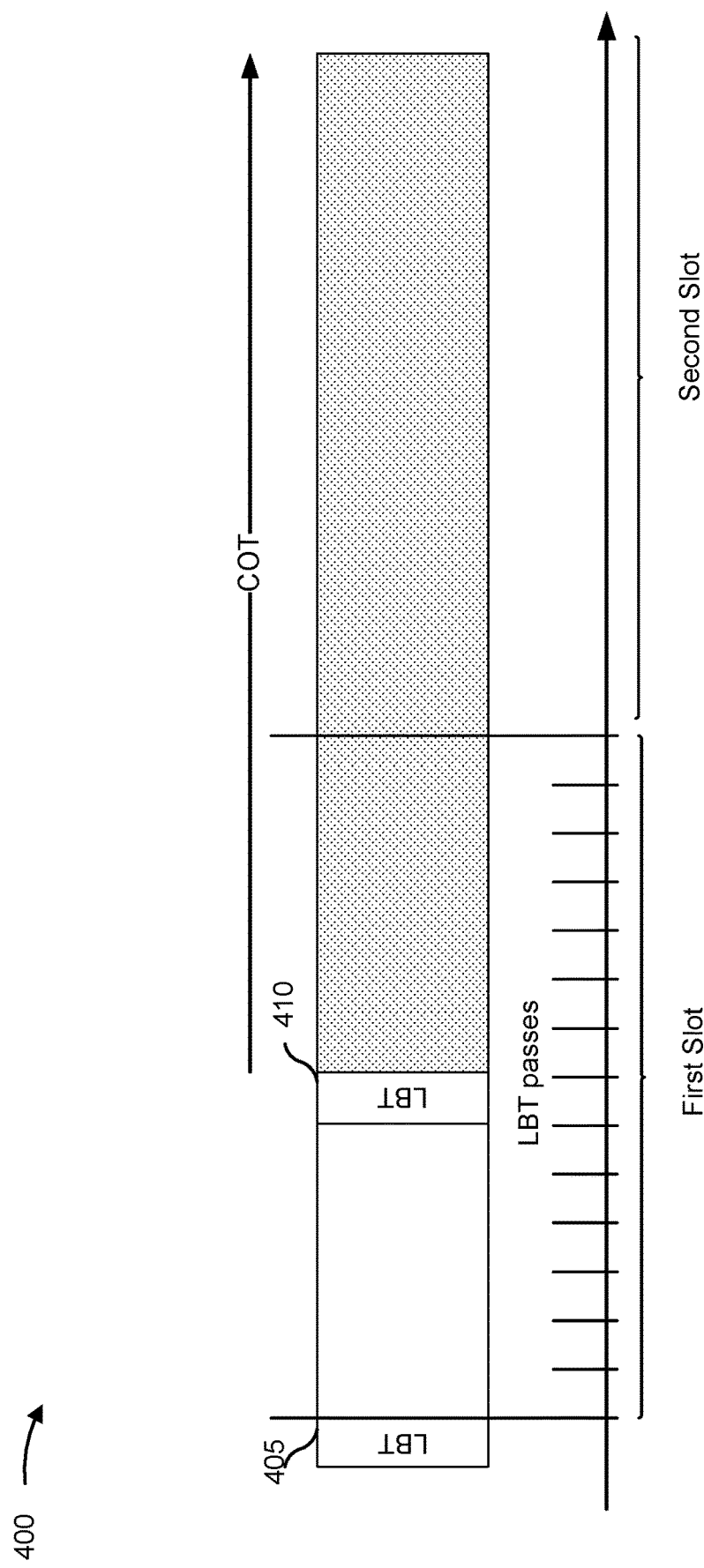
FIG. 4 is a diagram illustrating an example of New Radio (NR) communications in an unlicensed spectrum, in accordance with the present disclosure.

FIG. 4 is a diagram illustrating an example 400 of NR communications in an unlicensed spectrum, in accordance with the present disclosure.

In a shared or unlicensed frequency band, a transmitting device may contend against other devices for channel access before transmitting on a shared or unlicensed channel to reduce and/or prevent collisions on the shared or unlicensed channel. To contend for channel access, the transmitting device may perform a channel access procedure, such as a listen-before-talk (or listen-before-transmit) (LBT) procedure or another type of channel access procedure, for shared or unlicensed frequency band channel access. The channel access procedure may be performed to determine whether the physical channel (e.g., the radio resources of the channel) are free to use or are busy (e.g., in use by another wireless communication device such as a UE, an IoT device, or a wireless local area network (WLAN) device, among other examples). The channel access procedure may include sensing or measuring the physical channel (e.g., performing an RSRP measurement, detecting an energy level, or performing another type of measurement) during a channel access gap (which may also be referred to as a contention window (CW)) and determining whether the shared or unlicensed channel is free or busy based at least in part on the signals sensed or measured on the physical channel (e.g., based at least in part on whether the measurement satisfies a threshold). If the transmitting device determines that the channel access procedure was successful, the transmitting device may perform one or more transmissions on the shared or unlicensed channel during a transmission opportunity (TXOP), which may extend for a channel occupancy time (COT).

A base station may perform one or more LBT procedures prior to transmitting a downlink communication to a UE in the unlicensed spectrum. In a case in which an LBT procedure is unsuccessful, the base station may not transmit the downlink communication in the unlicensed spectrum until a successful LBT procedure is performed. As shown in FIG. 4, prior to a first slot, the base station may perform a first LBT procedure 405 on a channel in the unlicensed spectrum, and the first LBT procedure 405 may be unsuccessful. Accordingly, the base station may not initiate a transmit a downlink communication on the channel at a beginning of the first slot. During the first slot, the base station may perform a second LBT procedure 410 on the channel, and the second LBT procedure 410 may be successful. The base station may then initiate a channel occupancy on the channel based on successfully passing the second LBT procedure 410, and the base station may transmit the downlink communication to the UE on the channel during a COT associated with the channel occupancy. For example, as shown in example 400, the COT associated with the channel occupancy may include a remainder of the first slot and a second slot.

In some examples, the base station may transmit a reference signal, such as a CSI-RS or a TRS, via the channel in the unlicensed spectrum. For example, the reference signal may be a periodic reference signal and/or a semi-persistent scheduled reference signal. However, a scheduled time instance for transmitting the reference signal may not fall with the channel occupancy. For example, the scheduled time instance may fall between an unsuccessful LBT procedure (e.g., the first LBT procedure 405) and a successful LBT procedure (e.g., the second LBT procedure 410). In this case, the base station may not transmit the reference signal on the channel at the scheduled time instance.

As indicated above, FIG. 4 is provided as an example. Other examples may differ from what is described with respect to FIG. 4.

Figure 5:
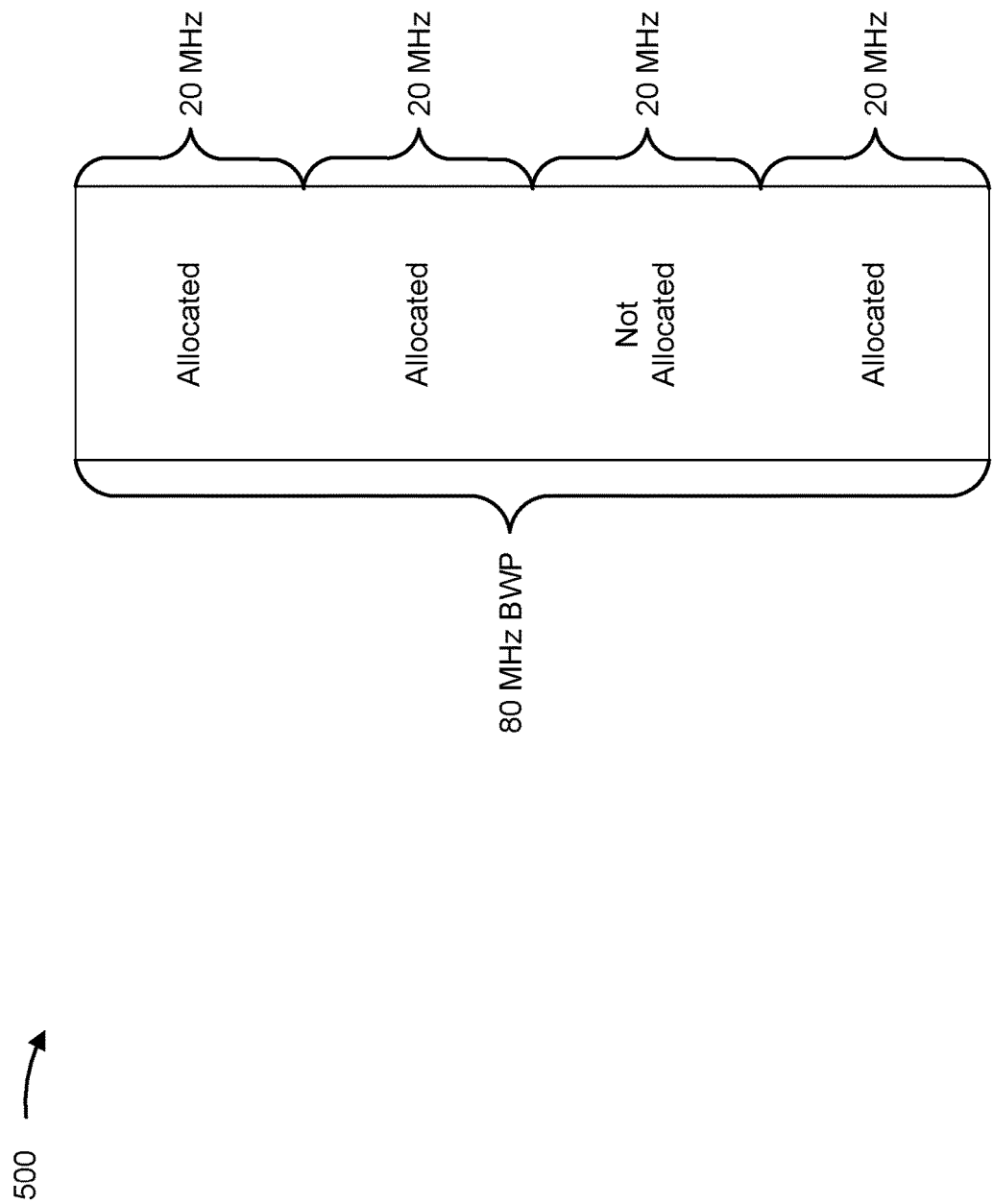
FIG. 5 is a diagram illustrating an example of NR communications in multiple sub-bands of an unlicensed spectrum, in accordance with the present disclosure

FIG. 5 is a diagram illustrating an example 500 of NR communications in multiple sub-bands of an unlicensed spectrum, in accordance with the present disclosure.

As shown in FIG. 5, a transmitting device, such as a base station, may perform LBT for multiple sub-bands in the unlicensed spectrum. For example, in a standard promulgated by 3GPP, LBT may be performed on 20 MHz sub-bands in order to transmit in an unlicensed spectrum. In a case in which a base station is transmitting a downlink communication to a UE on a channel in the unlicensed spectrum, and a bandwidth part (BWP) for the downlink communication is larger than 20 MHz, the base station may only transmit in 20 MHz bands that successfully pass an LBT procedure. This may result in one or more 20 MHz holes in the frequency domain in the downlink communication. As used herein "holes" in the frequency domain refer to one or more sub-bands in which the reference signal is not transmitted.

As shown in FIG. 5, a downlink transmission, such as a reference signal, may have an 80 MHz BWP. In this case, the base station may attempt to allocate four 20 MHz sub-bands in the unlicensed spectrum for transmitting the downlink communication. For each sub-band, the base station may perform a respective LBT procedure and allocate the sub-band for transmitting a portion of the downlink communication based on the passing the LBT procedure in the sub-band. However, the base station may not allocate a sub-band for transmitting a portion of the downlink communication if the LBT procedure in the sub-band is not passed. For example, as shown in FIG. 5, one of the 20 MHz sub-bands is not allocated due to the LBT procedure in that sub-band not being passed.

As indicated above, FIG. 5 is provided as an example. Other examples may differ from what is described with respect to FIG. 5.

A UE may expect to receive a reference signal, such as a CSI-RS or a TRS, from a base station on a channel in an unlicensed spectrum at a certain time instance. For example, the reference signal may be a periodic or semi-persistent scheduled reference signal. However, if an LBT procedure, performed by the base station prior to transmitting the reference, fails for an entire bandwidth or for one or more sub-bands, the base station may not transmit all or one or more portions (e.g., in 20 MHz sub-bands) of the reference signal. The UE may ignore the reference signal, if it is outside of a COT associated with a channel occupancy initiated by the base station or if at least one sub-band is not transmitted by the base station. In some cases, the base station may transmit, to the UE, information indicating the COT and the availability of the 20 MHz sub-bands via DCI 2.0. However, DCI 2.0 is an optional feature. Accordingly, in some cases, DCI 2.0 may not be transmitted by the base station and/or may not be supported by the UE.

In cases in which DCI 2.0 is not transmitted by the base station and/or not supported by the UE, the UE does not receive information indicating whether the reference signal is within the channel occupancy and/or whether the reference signal is not transmitted by the base station in one or more sub-bands due to an unsuccessful LBT procedure. If the UE expects to receive the reference signal at a certain time instance and the UE is unaware that the reference signal has not been sent or has holes in the frequency domain, all processing performed by the UE based on the reference signal may be inaccurate. For example, in the case of a periodic or semi-persistent CSI-RS, channel state feedback (CSF) processing based on the CSI-RS may be inaccurate. In the case of a periodic or semi-persistent TRS, frequency and time tracking loops based on TRS processing may be inaccurate. This may decrease the quality, speed, and reliability of communications between the base station and the UE.

Some techniques and apparatuses described herein enable a UE to detect whether a reference signal is present in a channel at a time instance at which the reference signal is expected. The UE may selectively gate processing of the reference signal based at least in part on detecting whether the reference signal is present in the channel. As a result, the UE may avoid inaccurate processing, such as CSF processing and/or TRS processing for frequency and time tracking loops, when the reference signal is not transmitted in the time instance and/or has holes in the frequency domain. This may increase the quality, speed, and reliability of communications between the UE and a base station.

Figure 6:
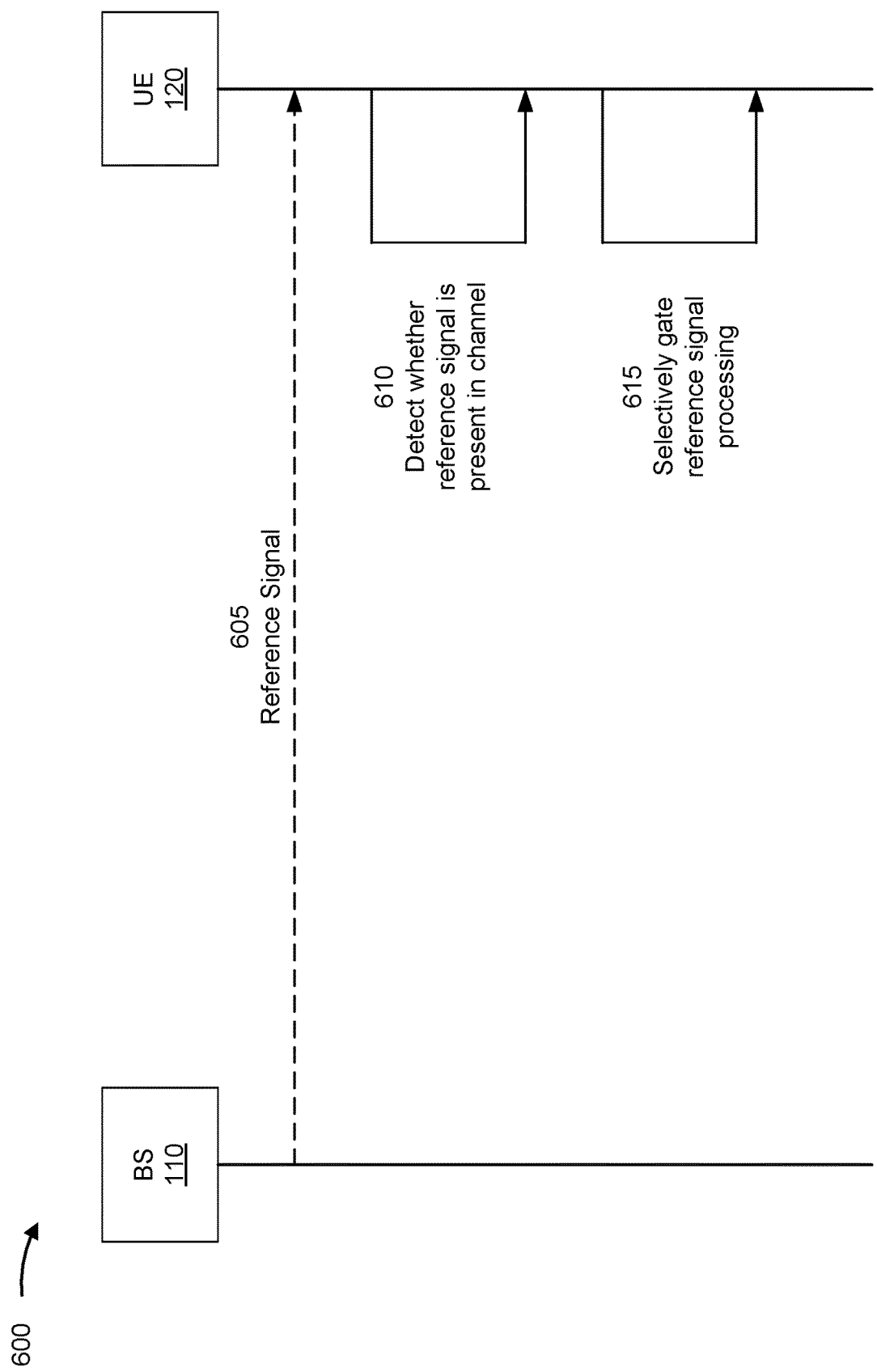
FIG. 6 is a diagram illustrating an example associated with detection of reference signals and gating of reference signal processing in an unlicensed spectrum, in accordance with the present disclosure.

FIG. 6 is a diagram illustrating an example 600 associated with detection of reference signals and gating of reference signal processing in an unlicensed spectrum, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 6, and by reference number 605, the base station 110 may transmit, to the UE 120, a reference signal. In some aspects, the base station 110 may transmit the reference signal on a channel of an unlicensed spectrum at a time instance at which the reference signal is expected by the UE 120. In some aspects, the reference signal may be a CSI-RS. In some aspects, the reference signal may be a TRS. In some aspects, the reference signal may be an SSB.

In some aspects, the reference signal may be a periodic reference signal or a semi-persistent scheduled reference signal. In this case, the time instances at which the reference signal is expected may be based at least in part on a periodicity of the reference signal. In some aspects, the time at which the reference signal is expected may be based at least in part on a communication, such as a radio resource control (RRC) message, that schedules one or more time instances (e.g., periodically occurring time instances) for occurrences of the reference signal. For example, the UE 120 may receive from the base station 110 an RRC message that includes a semi-persistent scheduling (SPS) configuration that indicates a periodicity for occurrences of the reference signal.

The base station 110 may perform one or more LBT procedures prior to transmitting the reference signal on the channel of the unlicensed spectrum. In some aspects, the base station 110 may perform a respective LBT procedure on each of a plurality of sub-bands (e.g., 20 MHz sub-bands) in the unlicensed spectrum. In some aspects, the base station 110 may not transmit the reference signal at the time instance at which the reference signal is expected by the UE 120. For example, the base station 110 may not transmit the reference signal in a case in which the time instance at which the reference signal is expected falls outside of a channel occupancy initiated by the base station 110 based at least in part on an unsuccessful LBT procedure. In some aspects, the base station 110 may transmit the reference signal with one or more holes in the frequency domain. For example, the base station 110 may not transmit portions of the reference signal in one or more sub-bands based at least in part on respective unsuccessful LBT procedures in the one or more sub-bands.

As further shown in FIG. 6, and by reference number 610, the UE 120 may detect whether the reference signal is present in the channel at the time instance at which the reference signal is expected. In some aspects, the UE 120 may determine whether the reference signal is present in the channel based at least in part on one or more signal measurements on the channel. For example, the UE 120 may determine whether the reference signal is present based on one or more measurements of received signal-to-noise ratio (SNR) on the channel, one or more measurements of received power (e.g., RSRP) on the channel, or a combination thereof. As described herein in connection with example 600 of FIG. 6, the UE 120 may use SNR measurements to determine whether the reference signal is present in the channel. However, in some aspects, the UE 120 may use other signal measurements, such as measurements of received power, instead of or in addition to SNR measurements.

The UE 120 may detect whether the signal is present in a channel in a time domain and/or the UE 120 may detect whether the signal is present in multiple sub-bands in the frequency domain. In some aspects, the UE 120 may detect whether the signal is present in the channel or fully absent from the channel in the time domain, and the UE 120 may detect whether the signal is present in each sub-band in the frequency domain based on detecting that the signal is present (e.g., not fully absent) in the channel in the time domain.

In some aspects, the UE 120 may detect whether the signal is present in the time domain based on an SNR measurement in the time domain. The UE 120 may measure the received SNR on the channel in the time domain at the time instance at which the reference signal is expected. For example, the UE 120 may measure the SNR in the time domain over an entire frequency range of the channel. The UE 120 may compare the time domain SNR measurement with a first threshold (e.g., a time domain SNR threshold). The UE 120 may detect that the reference signal is present in the channel in the time domain based on a determination that the time domain SNR measurement satisfies the first threshold. The UE 120 may detect that the reference signal is not present (e.g., fully absent) in the channel in the time domain based on a determination that the time domain SNR does not satisfy the first threshold.

In some aspects, the UE 120 may detect whether the reference signal is present in the frequency domain in each of the multiple sub-bands in the channel. For example, the UE 120 may detect whether the reference signal is present in each of a plurality of 20 MHz sub-bands. The UE 120 may measure a respective SNR in the frequency domain for each sub-band. For example, the SNR measured for a sub-band may be the received SNR on that sub-band. For each sub-band, the UE 120 may compare the respective frequency domain SNR measurement for that sub-band with a second threshold (e.g., a frequency domain SNR threshold). The UE 120 may detect that the reference signal is present in the frequency domain for a sub-band based on a determination that the frequency domain SNR measurement for that sub-band satisfies the second threshold. The UE 120 may detect that the reference signal is not present in the frequency domain for a sub-band based on a determination that the frequency domain SNR measurement for that sub-band does not satisfy the threshold. In some aspects, the UE 120 may determine that the reference signal has one or more holes in the frequency domain corresponding to the reference signal not being present in one or more of the sub-bands. For example, the UE 120 may determine that the reference signal is present in one or more of the sub-bands, and the UE 120 may determine that the reference signal is not present in at least one sub-band.

As further shown in FIG. 6, and by reference number 615, the UE 120 may selectively gate processing of the reference signal based on detecting whether the reference signal is present in the channel. In some aspects, the UE 120 may gate processing of the reference signal by preventing processing of the reference signal and freezing measurements, estimation, and/or computations performed based at least in part on processing the reference signal, for at least the occurrence of the reference signal associated with the time period at which the reference signal is expected. In some aspects, UE 120 may gate processing of the reference signal based at least in part on detecting that the reference signal is not present in the channel in the time or domain or detecting that the reference signal is not present in at least one sub-band in the frequency domain. In some aspects, the UE 120 may stop gating processing of the reference signal based at least in part on detecting, at a subsequent time instance associated with a subsequent occurrence of the reference signal, that the reference signal is present in the channel.

In some aspects, the UE 120 may completely gate processing of the reference signal for the occurrence of the reference signal associated with the time instance at which the reference signal is expected based at least in part on detecting that the reference signal is not present in the channel in the time domain. In some aspects, the UE 120 may completely gate processing of the reference signal for the occurrence of the reference signal associated with the time instance at which the reference signal is expected based at least in part on detecting that the reference signal is not present in the frequency domain in at least one sub-band of the plurality of sub-bands. In some aspects, in a case in which the reference signal is detected as present in the frequency domain in one or more sub-bands and the reference signal is detected not to be present in the frequency domain in at least one sub-band, the UE 120 may process the reference signal using portions of the reference signal in one or more sub-bands in which the reference signal is detected as present.

The UE 120 may continually adjust filter values of one or more filters based on periodic occurrences of the reference signal. For example, the UE 120 may adjust filter values of a filter used for Doppler estimation, a filter used for spectral efficiency estimation, and/or other filters continually updated by the UE 120 based on periodic occurrences of a CSI-RS and/or a TRS. In some aspects, when the UE 120 gates processing of the reference signal for the occurrence of the reference signal, the UE 120 may prevent current filter values of filters from changing based on processing the occurrence of the reference signal. For example, for each filter having a filter value that is based at least in part on processing the reference signal, the UE 120 may freeze the filter value at the current filter value.

In some aspects, when gating processing of an occurrence of a CSI-RS, the UE 120 may prevent CSF reporting based on processing the CSI-RS. For example, the UE 120 may prevent computing and/or reporting (e.g., in a CSI report), to the base station 110, channel estimation parameters, such as a CQI, PMI, CRI, LI, RI, or an RSRP, among other examples) based at least in part on the occurrence of the CSI-RS.

In some aspects, when gating processing of an occurrence of a TRS, the UE 120 may prevent loops processing for time and frequency tracking based on the occurrence of the TRS. In some aspects, when gating processing of an occurrence of an SSB, the UE 120 may prevent loops processing for time and frequency tracking based on the occurrence of the SSB.

In some aspects, the UE 120 may protect CSI-RS and/or TRS based processing loops in which an estimation or detection metric based on the reference signal is used to perform filter adjustments. In some aspects, the UE 120 may make use of partial CSI-RS and/or TRS information present in one or more of the sub-bands by modifying an estimation or detection metric and adjusting filter weights to account for the modified metric based at least in part on the partial CSI-RS information. In some aspects, the UE 120 may freeze the filter state for a missing or partially missing CSI-RS or TRS while reporting the previous results. An example of protecting Doppler estimation/filtering is described herein.

In TRS-based Doppler estimation, the UE 120 may process frequency domain TRS symbols to obtain a raw channel estimate and noise estimate, computer a Doppler log-likelihood (LL) metric for multiple Doppler/SNR hypotheses (e.g., in a 2D search grid), perform infinite impulse response (IIR) filtering to the Doppler LL metrics using a filter and state per hypothesis, conduct a 2D search for the maximum Doppler LL over all hypotheses, and report the most likely Doppler bin (e.g., the winning Doppler shift frequency (fD)). The UE 120 may input the frequency domain TRS symbols within a TRS burst. For example, the TRS burst may include one or two slots, containing two or four TRS symbols. In some aspects, in a case in which the UE 120 detects that the TRS is present in one or more of the sub-bands and the UE 120 detects that the TRS is not present in at least on sub-band, the UE 120 may modify the LL computation and the LL IIR filtering to make use of the present TRS symbols. For example, the UE 120 may detect a pattern of the present TRS symbols in the TRS burst, adjust the Doppler LL metric computation to only use the present TRS symbols as per the detected pattern, and adjust the LL IIR filtering (e.g., adjust the filter weights) to account for the modified LL metric that does not include all of the TRS symbols. Alternatively, in some aspects, in a case in which the TRS is missing or partially missing, the UE 120 may skip the LL computation, gate the IIR filtering (e.g., freeze the state of the LL IIR filter), and report a previous Doppler estimate.

In some aspects, the UE 120 may update a frequency tracking loop (FTL) and/or a time tracking loop (TTL) based at least in part on a TRS or an SSB. The UE 120 may calculate FTL updates based at least in part on a channel impulse response (CIR) from the TRS or SSB. The UE 120 may calculate TTL updates based at least in part on a signal energy estimate provided by a power delay profile (PDP) block using the TRS or SSB. However, missing TRS or SSB symbols (or missing TRS sub-bands) may compromise the FTL and/or TTL updates, resulting in inaccurate frequency and/or time tracking. In some aspects, the UE 120 may protect the FTL and/or TTL processing based at least in part on detecting that the TRS or SSB is missing or partially missing.

In some aspects, the UE 120 may perform SSB-based FTL updates. For an expected SSB occasion, the UE 120 may detect whether the SSB is present in the time domain. The SSB may be contained within a 20 MHz sub-band. Thus, the UE 120 may detect whether the SSB is fully present or missing using the time domain detection (e.g., without detecting whether the SSB is present in each of the sub-bands in the frequency domain). In some aspects, the UE 120 may gate an FTL update associated with an SSB occasion in connection with detecting that the SSB is missing. For example, the UE 120 may gate computation and IIR filtering of CIR auto-correlations and cross-correlations to not pollute the IIR filter state. In this case, the UE 120 may also gate FTL outer-loop updates (e.g., Kalman filter), either based at least in part on an FTL SNR metric or independent of the FTL SNR metric.

In some aspects, the UE 120 may perform TRS-based FTL updates. For an expected TRS burst (e.g., one slot or two slots), the UE 120 may perform time domain and/or frequency domain detection to detect missing TRS symbols and/or missing TRS sub-bands in the TRS burst. In some aspects, in connection with detecting missing TRS symbols and/or missing TRS sub-bands in the TRS burst set (e.g., detecting that the TRS burst is not fully present in the time domain and/or frequency domain), the UE 120 may skip processing for the TRS burst completely. In this case, the UE 120 may gate computation and IIR filtering of both CIR auto-correlations and cross-correlations for the TRS burst, and the UE 120 may gate FTL outer-loop (e.g., Kalman filter) updates associated with the TRS burst. In some aspects, in connection with detecting missing TRS symbols and/or missing TRS sub-bands in the TRS burst set, the UE 120 may modify the processing of the FTL update to calculate an FTL update based at least in part on the present TRS symbols and/or sub-bands. In some aspects, in a case in which a two-slot TRS burst is configured, the UE 120 may perform a dynamic fallback to one-slot TRS in connection with a determination that TRS symbols are fully present (e.g., in all sub-bands) in only one TRS slot of the two-slot TRS burst. In this case, the UE 120 may calculate the CIR and FTL correlations using only the slot in which the TRS symbols are fully present, and the UE may ignore the other TRS slot (e.g., in which the TRS symbols are not fully present) in the TRS burst. In some aspects, the UE 120 may modify the computation of the CIR and FTL correlations to account for partial TRS symbols. In this case, to prevent phase distortion from computations using different frequency sub-bands on different TRS symbols, the UE 120 may only use frequency sub-bands present in both TRS symbols of a TRS slot in the CIR/FTL computations.

In some aspects, the UE 120 may perform SSB-based TTL updates. For an expected SSB burst, the UE 120 may perform time domain SSB detection to detect, for each SSB symbol, whether the SSB is fully present or missing. In some aspects, the UE 120 may protect CIR combining (e.g., based at least in part on coherent filtering and non-coherent filtering) by excluding blanked SSB symbols (e.g., SSB symbols for which the SSB is not present in the SSB burst). In some aspects, the UE 120 may gate the TTL update step associated with the SSB burst in connection with detecting that the entire SSB burst is blanked (e.g., all of the SSBs are not present in the SSB burst).

In some aspects, the UE 120 may perform TRS-based TTL updates. For an expected TRS burst (e.g., one slot or two slots), the UE 120 may perform time domain and/or frequency domain detection to detect missing TRS symbols and/or missing TRS sub-bands in the TRS burst. In some aspects, in connection with detecting missing TRS symbols and/or missing TRS sub-bands in the TRS burst set (e.g., detecting that the TRS burst is not fully present in the time domain and/or frequency domain), the UE 120 may exclude TRS symbols in which the TRS is all or partially missing (e.g., in one or more sub-bands) from CIR combining. In some aspects, the UE 120 may gate the TTL update associated with the TRS burst if the TRS is at least partially missing (e.g., in one or more sub-bands) in all of the TRS symbols or if a CIR combining metric for the burst set does not satisfy a threshold. In some aspects, in connection with detecting a frequency domain hole (e.g., of one or more sub-bands) in the TRS for one or more of the TRS symbols in the TRS burst, the UE 120 may apply sub-band hole filling during CIR combining by forcing sub-bands detected as missing to zero (e.g., to avoid noise injection from those sub-bands) and using side information from other TRS symbols. In this case, the UE 120 may gate the TTL update if the CIR combining metric does not satisfy the threshold. In some aspects, in connection with detecting a frequency domain hole (e.g., of one or more sub-bands) in the TRS for one or more of the TRS symbols in the TRS burst, the UE 120 may modify the CIR combining with a fallback to non-coherent combining if certain TRS symbols are affected by sub-band holes. Such a fallback to non-coherent CIR combining may increase robustness against frequency domain hole induced time domain phase variations.

As described above in connection with FIG. 6, the UE 120 may detect whether a reference signal is present in a channel at a time instance at which the reference signal is expected. The UE 120 may selectively gate processing of the reference signal based at least in part on detecting whether the reference signal is present in the channel. As a result, the UE 120 may prevent inaccurate processing, such as CSF processing and/or TRS processing for frequency and time tracking loops, when the reference signal is not transmitted in the time instance and/or has holes in the frequency domain. This may increase the quality, speed, and reliability of communications between the UE 120 and the base station 110.

As indicated above, FIG. 6 is provided as an example. Other examples may differ from what is described with respect to FIG. 6.

Figure 7:
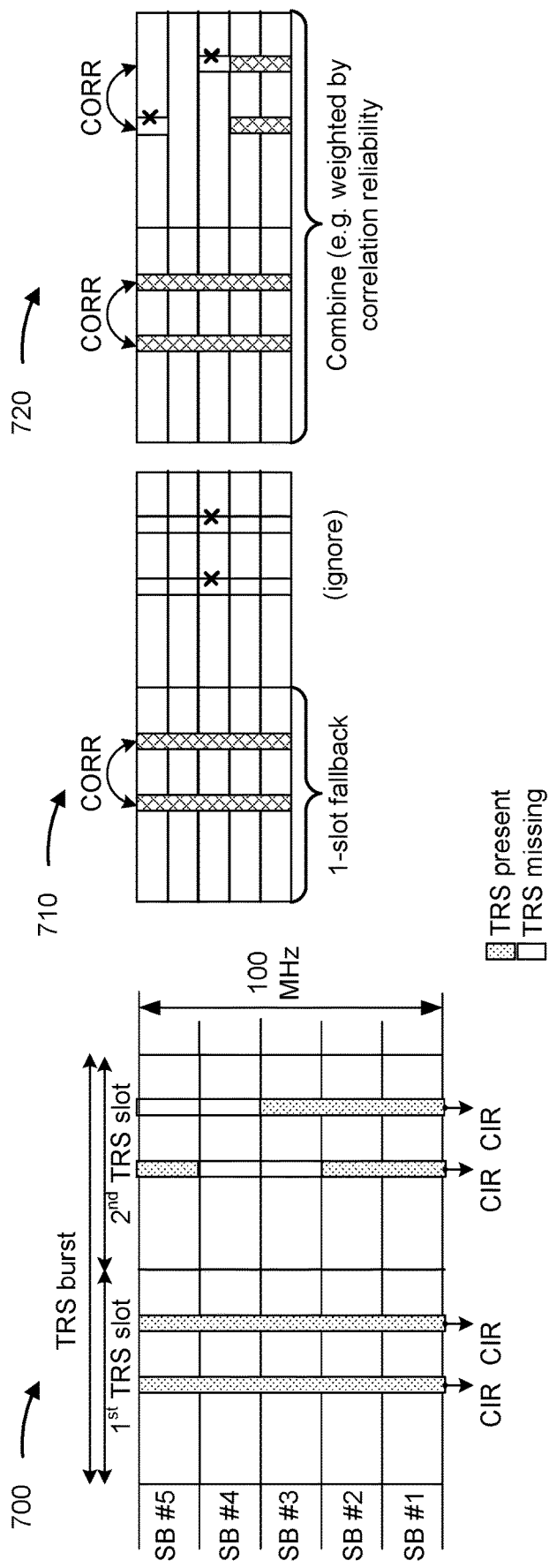
FIG. 7 is a diagram illustrating an example 700 associated with tracking reference signal (TRS)-based frequency tracking loop (FTL) processing, in accordance with the present disclosure.

FIG. 7 is a diagram illustrating an example 700 associated with TRS-based FTL processing, in accordance with the present disclosure. As shown in FIG. 7, example 700 includes a TRS burst including a first TRS slot and a second TRS slot. The first TRS slot and the second TRS slot each include two TRS symbols. As shown in FIG. 7, the TRS may be fully present in all frequency sub-bands (e.g., SB #1-SB #5) in both TRS symbols in the first TRS slot, and the TRS may have holes in the frequency domain in the TRS symbols in the second TRS slot. For example, the TRS may be missing in SB #3 and SB #4 in the first TRS symbol in the second TRS slot, and the TRS may be missing in SB #4 and SB #5 in the second TRS symbols in the second TRS slot.

In some aspects, in connection with detecting that the TRS burst is not fully present in the TRS burst set (e.g., detecting the frequency domain holes in TRS in the second TRS slot), the UE 120 may skip processing for the TRS burst completely. In this case, the UE 120 may gate computation and IIR filtering of both CIR auto-correlations and cross-correlations for the TRS burst, and the UE 120 may gate FTL outer-loop (e.g., Kalman filter) updates associated with the TRS burst.

As shown by reference number 710, in some aspects, in connection with detecting the missing TRS sub-bands in the second TRS slot of the TRS burst and a determination that the TRSs are fully present in the TRS symbols in the first TRS slot of the TRS burst, the UE 120 may perform a dynamic fallback to one-slot. In this case, the UE 120 may calculate the CIR and FTL correlations using only the first TRS slot in which the TRS symbols are fully present. In this case, the UE may ignore the second TRS slot, in which the TRS symbols are not fully present, in the TRS burst when calculated the CIR and FTL correlations.

As shown by reference number 720, in some aspects, the UE 120 may modify the computation of the CIR and FTL correlations to account for partial TRS symbols that are present in the TRS burst (e.g., the partial TRS symbols in the second TRS slot). In this case, for each TRS slot, the UE 120 may compute the CIR and FTL correlations using frequency the TRS sub-bands commonly available in both TRS symbols of the TRS slot. For example, because the TRS is present in all of the sub-bands in both TRS symbols in the first slot, the UE 120 may compute the CIR and FTL correlations in the first TRS slot using all of the frequency sub-bands. In the second TRS slot, the TRS is only present in both TRS symbols in SB #1 and SB #2. Accordingly, the UE 120 may compute the CIR and DTL correlations in the second TRS slot using only the TRS in SB #1 and SB #2. In this case, the UE 120 may ignore the TRS in SB #5 in the first TRS symbol in the second TRS slot, and the UE 120 may ignore the TRS in SB #3 in the second TRS symbol in the second TRS slot. In some aspects, the UE 120 may combine the correlations computed in the first TRS slot and the second TRS slot weighted by a correlation reliability in each slot. For example, the correlation reliability in a TRS slot may be based at least in part on the number of common sub-bands in which the TRS is present in both TRS symbols in the TRS slot.

As indicated above, FIG. 7 is provided as an example. Other examples may differ from what is described with respect to FIG. 7.

Figure 8:
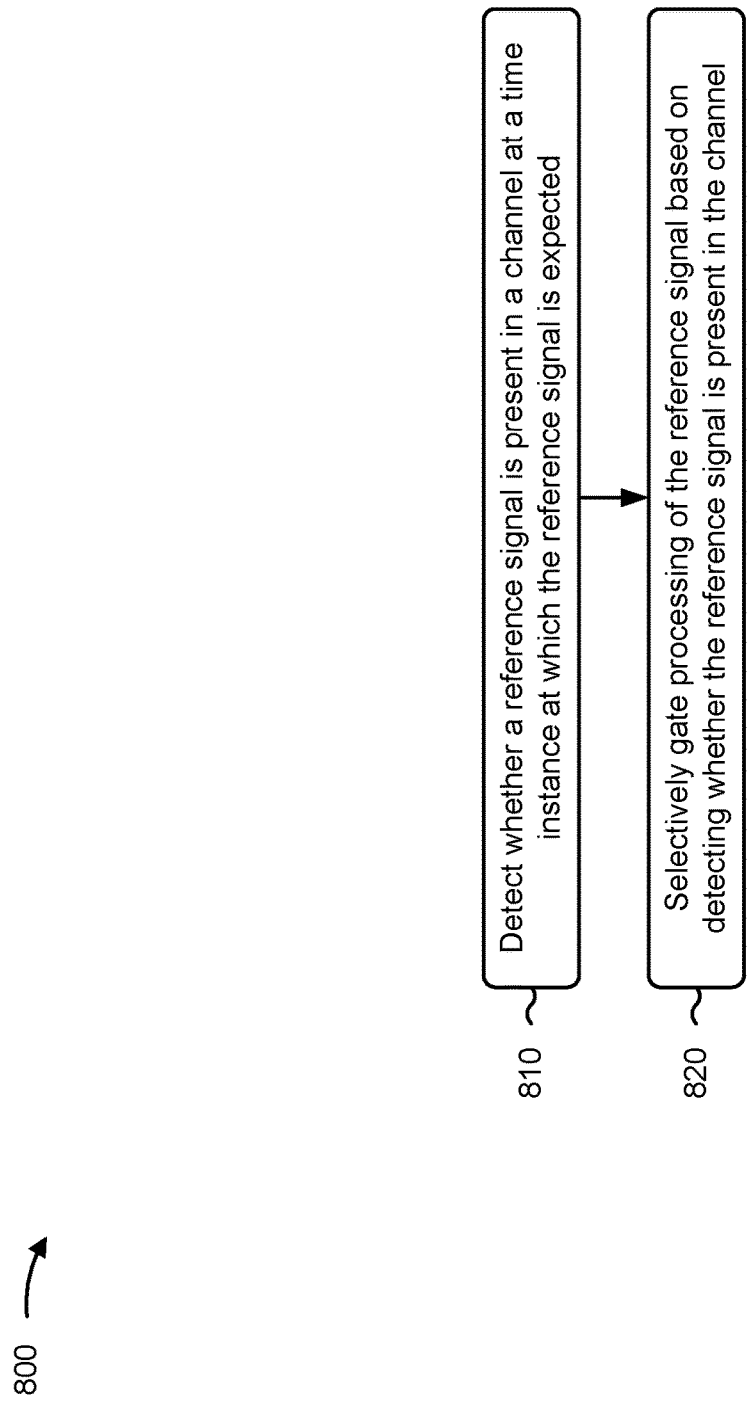
FIG. 8 is a diagram illustrating an example process associated with detection of reference signals and gating of reference signal processing in an unlicensed spectrum, in accordance with the present disclosure.

FIG. 8 is a diagram illustrating an example process 800 performed, for example, by a UE, in accordance with the present disclosure. Example process 800 is an example where the UE (e.g., UE 120) performs operations associated with detection of reference signals and gating of reference signal processing in an unlicensed spectrum.

As shown in FIG. 8, in some aspects, process 800 may include detecting whether a reference signal is present in a channel at a time instance at which the reference signal is expected (block 810). For example, the UE (e.g., using detection component 908, depicted in FIG. 9) may detect whether a reference signal is present in a channel at a time instance at which the reference signal is expected, as described above.

As further shown in FIG. 8, in some aspects, process 800 may include selectively gating processing of the reference signal based on detecting whether the reference signal is present in the channel (block 820). For example, the UE (e.g., using gating component 910, depicted in FIG. 910) may selectively gate processing of the reference signal based on detecting whether the reference signal is present in the channel, as described above.

Process 800 may include additional aspects, such as any single aspect or any combination of aspects described below and/or in connection with one or more other processes described elsewhere herein.

In a first aspect, the reference signal is a channel state information reference signal.

In a second aspect, alone or in combination with the first aspect, the reference signal is a tracking reference signal.

In a third aspect, alone or in combination with one or more of the first and second aspects, the channel is in an unlicensed spectrum.

In a fourth aspect, alone or in combination with one or more of the first through third aspects, detecting whether the reference signal is present in the channel comprises detecting whether the reference signal is present in the channel based at least in part on comparing a signal measurement on at least a sub-band of the channel with a threshold.

In a fifth aspect, alone or in combination with one or more of the first through fourth aspects, the signal measurement is a signal-to-noise ratio.

In a sixth aspect, alone or in combination with one or more of the first through fourth aspects, the signal measurement is a measurement of received power.

In a seventh aspect, alone or in combination with one or more of the first through sixth aspects, detecting whether the reference signal is present in the channel comprises detecting whether the reference signal is present in the channel in a time domain at the time instance at which the reference signal is expected.

In an eighth aspect, alone or in combination with one or more of the first through seventh aspects, detecting whether the reference signal is present in the channel in the time domain comprises measuring a signal measurement on the channel in the time domain, and comparing the signal measurement on the channel in the time domain with a time domain signal measurement threshold.

In a ninth aspect, alone or in combination with one or more of the first through eighth aspects, selectively gating processing of the reference signal comprises gating processing of the reference signal completely for an occurrence of the reference signal associated with the time instance at which the reference signal is expected based at least in part on detecting that the reference signal is not present in the channel in the time domain.

In a tenth aspect, alone or in combination with one or more of the first through ninth aspects, detecting whether the reference signal is present in the channel comprises detecting whether the reference signal is present in a frequency domain in each of a plurality of sub-bands in the channel.

In an eleventh aspect, alone or in combination with one or more of the first through tenth aspects, detecting whether the reference signal is present in the frequency domain in each of the plurality of sub-bands in the channel comprises measuring a respective signal measurement in the frequency domain on each of the plurality of sub-bands, and comparing the respective signal measurement in the frequency domain on each of the plurality of sub-bands with a frequency domain signal measurement threshold.

In a twelfth aspect, alone or in combination with one or more of the first through eleventh aspects, the plurality of sub-bands includes a plurality of 20 MHz sub-bands.

In a thirteenth aspect, alone or in combination with one or more of the first through twelfth aspects, the plurality of sub-bands includes sub-bands associated with an LBT procedure performed by a base station.

In a fourteenth aspect, alone or in combination with one or more of the first through thirteenth aspects, selectively gating processing of the reference signal comprises gating processing of the reference signal completely for an occurrence of the reference signal associated with the time instance at which the reference signal is expected based at least in part on detecting that the reference signal is not present in the frequency domain in at least one sub-band of the plurality of sub-bands.

In a fifteenth aspect, alone or in combination with one or more of the first through thirteenth aspects, selectively gating processing of the reference signal comprises processing the reference signal using portions of the reference signal in one or more sub-bands in which the reference signal is present in the frequency domain based at least in part on detecting that the reference signal is not present in the frequency domain in at least one sub-band of the plurality of sub-bands.

In a sixteenth aspect, alone or in combination with one or more of the first through fifteenth aspects, detecting whether the reference signal is present in the channel comprises detecting whether the reference signal is present in the channel in a time domain at the time instance at which the reference signal is expected, and detecting, based at least in part on a determination that the reference signal is present in the channel in the time domain, whether the reference signal is present in a frequency domain in each of a plurality of sub-bands in the channel.

In a seventeenth aspect, alone or in combination with one or more of the first through sixteenth aspects, selectively gating processing of the reference signal comprises gating processing of the reference signal for an occurrence of the reference signal associated with the time instance at which the reference signal is expected based on detecting that the reference signal is not present in the channel.

In an eighteenth aspect, alone or in combination with one or more of the first through seventeenth aspects, gating processing of the reference signal comprises preventing, for a filter having a filter value that is based at least in part on processing the reference signal, a current value of the filter value from changing based on processing the occurrence of the reference signal associated with the time instance at which the reference signal is expected.

In a nineteenth aspect, alone or in combination with one or more of the first through eighteenth aspects, the reference signal is a periodic reference signal.

In a twentieth aspect, alone or in combination with one or more of the first through nineteenth aspects, the time instance at which the reference signal is expected is based at least in part on a periodicity of the reference signal.

In a twenty-first aspect, alone or in combination with one or more of the first through twentieth aspects, the reference signal is a semi-persistent scheduled reference signal.

In a twenty-second aspect, alone or in combination with one or more of the first through twenty-first aspects, the time instance at which the reference signal is expected is based at least in part a radio resource control message, received from a base station, that configures time instances for multiple occurrences of the reference signal.

In a twenty-third aspect, alone or in combination with one or more of the first through twenty-second aspects, process 800 includes receiving, from a base station prior to the time instance at which the reference signal is expected, an indication that schedules the time instance at which the reference signal is expected.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
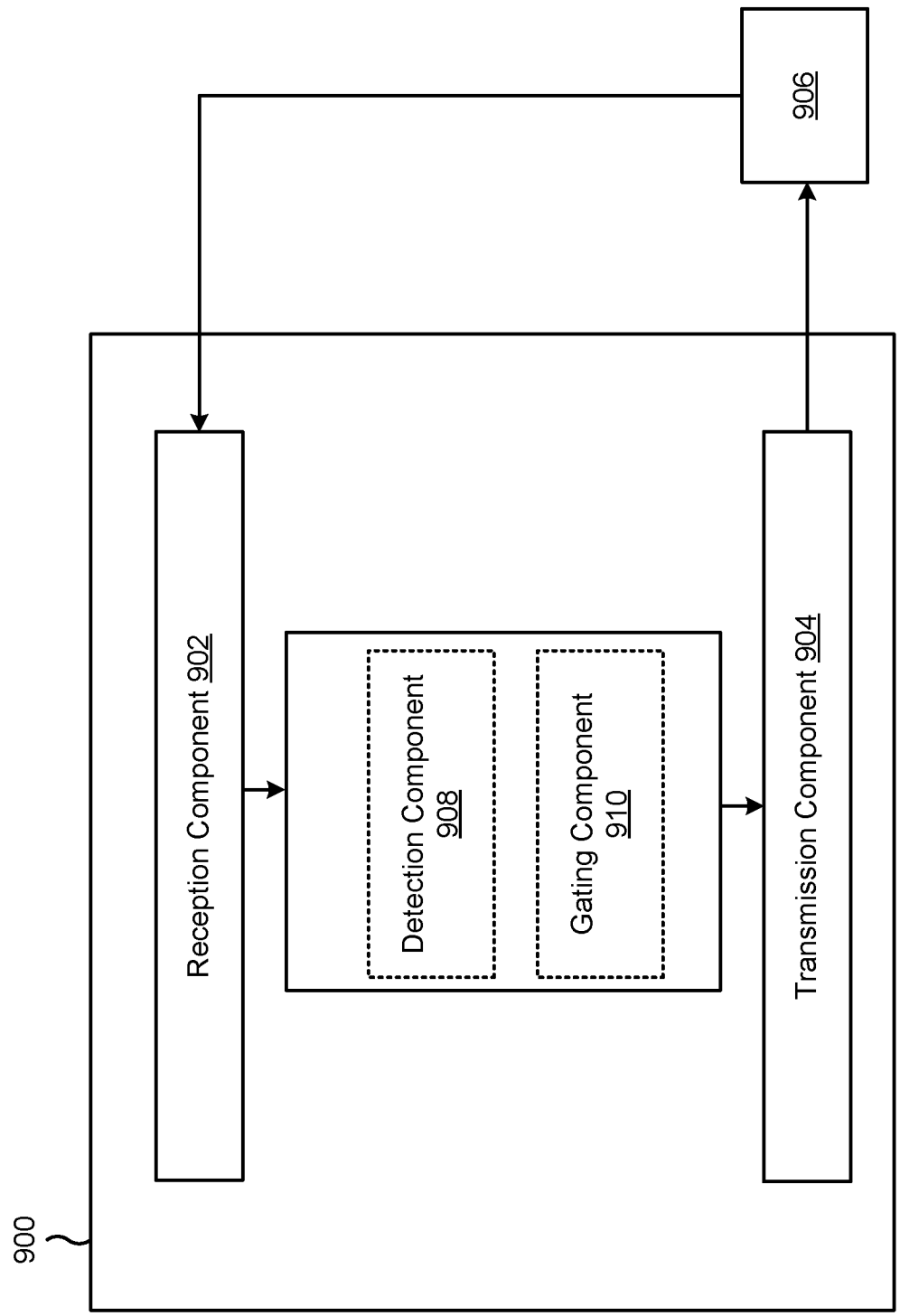
FIG. 9 is a block diagram of an example apparatus for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a detection component 908 or a gating component 910, among other examples.

In some aspects, the apparatus 900 may be configured to perform one or more operations described herein in connection with FIGS. 6-7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The detection component 908 may detect whether a reference signal is present in a channel at a time instance at which the reference signal is expected. The gating component 910 may selectively gate processing of the reference signal based on detecting whether the reference signal is present in the channel.

The reception component 902 may receive, from a base station prior to the time instance at which the reference signal is expected, an indication that schedules the time instance at which the reference signal is expected.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some aspects of the present disclosure:

Aspect 1: A method of wireless communication performed by a user equipment (UE), comprising: detecting whether a reference signal is present in a channel at a time instance at which the reference signal is expected; and selectively gating processing of the reference signal based on detecting whether the reference signal is present in the channel.

Aspect 2: The method of aspect 1, wherein the reference signal is a channel state information reference signal.

Aspect 3: The method of any of aspects 1-2, wherein the reference signal is a tracking reference signal.

Aspect 4: The method of any of aspects 1-3, wherein the channel is in an unlicensed spectrum.

Aspect 5: The method of any of aspects 1-4, wherein detecting whether the reference signal is present in the channel comprises: detecting whether the reference signal is present in the channel based at least in part on comparing a signal measurement on at least a sub-band of the channel with a threshold.

Aspect 6: The method of aspect 5, wherein the signal measurement is a signal-to-noise ratio.

Aspect 7: The method of aspect 5, wherein the signal measurement is a measurement of received power.

Aspect 8: The method of any of aspects 1-7, wherein detecting whether the reference signal is present in the channel comprises: detecting whether the reference signal is present in the channel in a time domain at the time instance at which the reference signal is expected.

Aspect 9: The method of aspect 8, wherein detecting whether the reference signal is present in the channel in the time domain comprises: measuring a signal measurement on the channel in the time domain; and comparing the signal measurement on the channel in the time domain with a time domain signal measurement threshold.

Aspect 10: The method of any of aspects 8-9, wherein selectively gating processing of the reference signal comprises: gating processing of the reference signal completely for an occurrence of the reference signal associated with the time instance at which the reference signal is expected based at least in part on detecting that the reference signal is not present in the channel in the time domain.

Aspect 11: The method of any of aspects 1-10, wherein detecting whether the reference signal is present in the channel comprises: detecting whether the reference signal is present in a frequency domain in each of a plurality of sub-bands in the channel.

Aspect 12: The method of aspect 11, wherein detecting whether the reference signal is present in the frequency domain in each of the plurality of sub-bands in the channel comprises: measuring a respective signal measurement in the frequency domain on each of the plurality of sub-bands; and comparing the respective signal measurement in the frequency domain on each of the plurality of sub-bands with a frequency domain signal measurement threshold.

Aspect 13: The method of any of aspects 11-12, wherein the plurality of sub-bands includes a plurality of 20 MHz sub-bands.

Aspect 14: The method of any of aspects 11-13, wherein the plurality of sub-bands includes sub-bands associated with a listen before talk (LBT) procedure performed by a base station.

Aspect 15: The method of any of aspects 11-14, wherein selectively gating processing of the reference signal comprises: gating processing of the reference signal completely for an occurrence of the reference signal associated with the time instance at which the reference signal is expected based at least in part on detecting that the reference signal is not present in the frequency domain in at least one sub-band of the plurality of sub-bands.

Aspect 16: The method of any of aspects 11-14, wherein selectively gating processing of the reference signal comprises: processing the reference signal using portions of the reference signal in one or more sub-bands in which the reference signal is present in the frequency domain based at least in part on detecting that the reference signal is not present in the frequency domain in at least one sub-band of the plurality of sub-bands.

Aspect 17: The method of any of aspects 1-16, wherein detecting whether the reference signal is present in the channel comprises: detecting whether the reference signal is present in the channel in a time domain at the time instance at which the reference signal is expected; and detecting, based at least in part on a determination that the reference signal is present in the channel in the time domain, whether the reference signal is present in a frequency domain in each of a plurality of sub-bands in the channel.

Aspect 18: The method of any of aspects 1-17, wherein selectively gating processing of the reference signal comprises: gating processing of the reference signal for an occurrence of the reference signal associated with the time instance at which the reference signal is expected based on detecting that the reference signal is not present in the channel.

Aspect 19: The method of aspect 18, wherein gating processing of the reference signal comprises: preventing, for a filter having a filter value that is based at least in part on processing the reference signal, a current value of the filter value from changing based on processing the occurrence of the reference signal associated with the time instance at which the reference signal is expected.

Aspect 20: The method of any of aspects 1-19, wherein the reference signal is a periodic reference signal.

Aspect 21: The method of aspect 20, wherein the time instance at which the reference signal is expected is based at least in part on a periodicity of the reference signal.

Aspect 22: The method of any of aspects 1-21, wherein the reference signal is a semi-persistent scheduled reference signal.

Aspect 23: The method of aspect 22, wherein the time instance at which the reference signal is expected is based at least in part a radio resource control message, received from a base station, that configures time instances for multiple occurrences of the reference signal.

Aspect 24: The method of any of aspects 1-23, further comprising: receiving, from a base station prior to the time instance at which the reference signal is expected, an indication that schedules the time instance at which the reference signal is expected.

Aspect 25: An apparatus for wireless communication at a device, comprising a processor; memory coupled with the processor; and instructions stored in the memory and executable by the processor to cause the apparatus to perform the method of one or more aspects of aspects 1-24.

Aspect 26: A device for wireless communication, comprising a memory and one or more processors coupled to the memory, the memory and the one or more processors configured to perform the method of one or more aspects of aspects 1-24.

Aspect 27: An apparatus for wireless communication, comprising at least one means for performing the method of one or more aspects of aspects 1-24.

Aspect 28: A non-transitory computer-readable medium storing code for wireless communication, the code comprising instructions executable by a processor to perform the method of one or more aspects of aspects 1-24.

Aspect 29: A non-transitory computer-readable medium storing a set of instructions for wireless communication, the set of instructions comprising one or more instructions that, when executed by one or more processors of a device, cause the device to perform the method of one or more aspects of aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      detect whether a reference signal is present in a channel at a time instance at which the reference signal is expected; and
      selectively gate processing of the reference signal based on whether the reference signal is present in the channel, wherein selectively gating processing of the reference signal when the reference signal is not detected in the channel comprises gating reporting of an estimate of the channel based on the reference signal.

2. The UE of claim 1, wherein the reference signal is a channel state information reference signal or a tracking reference signal, and wherein the channel is in an unlicensed spectrum.

3. The UE of claim 1, wherein the one or more processors, when detecting whether the reference signal is present in the channel, are configured to:
   detect whether the reference signal is present in the channel based at least in part on comparing a signal measurement on at least a sub-band of the channel with a threshold.

4. The UE of claim 3, wherein the signal measurement is at least one of a signal-to-noise ratio or a measurement of received power.

5. The UE of claim 1, wherein the one or more processors, when detecting whether the reference signal is present in the channel, are configured to:
   detect whether the reference signal is present in the channel in a time domain at the time instance at which the reference signal is expected.

6. The UE of claim 5, wherein the one or more processors, when detecting whether the reference signal is present in the channel in the time domain, are configured to:
   measure a signal measurement on the channel in the time domain; and
   compare the signal measurement on the channel in the time domain with a time domain signal measurement threshold.

7. The UE of claim 5, wherein the one or more processors, when selectively gating processing of the reference signal, are configured to:
   gate processing of the reference signal completely for an occurrence of the reference signal associated with the time instance at which the reference signal is expected based at least in part on detecting that the reference signal is not present in the channel in the time domain.

8. The UE of claim 1, wherein the one or more processors, when detecting whether the reference signal is present in the channel, are configured to:
   detect whether the reference signal is present in a frequency domain in each of a plurality of sub-bands in the channel.

9. The UE of claim 8, wherein the one or more processors, when detecting whether the reference signal is present in the frequency domain in each of the plurality of sub-bands in the channel, are configured to:
   measure a respective signal measurement in the frequency domain on each of the plurality of sub-bands; and
   compare the respective signal measurement in the frequency domain on each of the plurality of sub-bands with a frequency domain signal measurement threshold.

10. The UE of claim 8, wherein the plurality of sub-bands includes a plurality of 20 MHz sub-bands.

11. The UE of claim 8, wherein the plurality of sub-bands includes sub-bands associated with a listen before talk (LBT) procedure performed by a base station.

12. The UE of claim 8, wherein the one or more processors, when selectively gating processing of the reference signal, are configured to:
   gate processing of the reference signal completely for an occurrence of the reference signal associated with the time instance at which the reference signal is expected based at least in part on detecting that the reference signal is not present in the frequency domain in at least one sub-band of the plurality of sub-bands.

13. The UE of claim 8, wherein the one or more processors, when selectively gating processing of the reference signal, are configured to:
   process the reference signal using portions of the reference signal in one or more sub-bands in which the reference signal is present in the frequency domain based at least in part on detecting that the reference signal is not present in the frequency domain in at least one sub-band of the plurality of sub-bands.

14. The UE of claim 1, wherein the one or more processors, when detecting whether the reference signal is present in the channel, are configured to:
   detect whether the reference signal is present in the channel in a time domain at the time instance at which the reference signal is expected; and
   detect, based at least in part on a determination that the reference signal is present in the channel in the time domain, whether the reference signal is present in a frequency domain in each of a plurality of sub-bands in the channel.

15. The UE of claim 1, wherein the one or more processors, when selectively gating processing of the reference signal, are configured to:
   gate processing of the reference signal for an occurrence of the reference signal associated with the time instance at which the reference signal is expected when the reference signal is not present in the channel.

16. The UE of claim 15, wherein the one or more processors, when gating processing of the reference signal, are configured to:
   prevent, for a filter having a filter value that is based at least in part on processing the reference signal, a current value of the filter value from changing based on processing the occurrence of the reference signal associated with the time instance at which the reference signal is expected.

17. The UE of claim 1, wherein the reference signal is a periodic reference signal, and wherein the time instance at which the reference signal is expected is based at least in part on a periodicity of the reference signal.

18. The UE of claim 1, wherein the reference signal is a semi-persistent scheduled reference signal, and wherein the time instance at which the reference signal is expected is based at least in part a radio resource control message, received from a base station, that configures time instances for multiple occurrences of the reference signal.

19. The UE of claim 1, the one or more processors are further configured to:
   receive, from a base station prior to the time instance at which the reference signal is expected, an indication that schedules the time instance at which the reference signal is expected.

20. A method of wireless communication performed by a user equipment (UE), comprising:
   detecting whether a reference signal is present in a channel at a time instance at which the reference signal is expected; and
   selectively gating processing of the reference signal based on whether the reference signal is present in the channel, wherein selectively gating processing of the reference signal when the reference signal is not detected in the channel comprises gating reporting of an estimate of the channel based on the reference signal.

21. The method of claim 20, wherein detecting whether the reference signal is present in the channel comprises:
   detecting whether the reference signal is present in the channel based at least in part on comparing a signal measurement on at least a sub-band of the channel with a threshold, wherein the signal measurement is at least one of a signal-to-noise ratio or a measurement of received power.

22. The method of claim 20, wherein detecting whether the reference signal is present in the channel comprises:
   detecting whether the reference signal is present in the channel in a time domain at the time instance at which the reference signal is expected.

23. The method of claim 22, wherein selectively gating processing of the reference signal comprises:
   gating processing of the reference signal completely for an occurrence of the reference signal associated with the time instance at which the reference signal is expected based at least in part on detecting that the reference signal is not present in the channel in the time domain.

24. The method of claim 20, wherein detecting whether the reference signal is present in the channel comprises:
   detecting whether the reference signal is present in a frequency domain in each of a plurality of sub-bands in the channel.

25. The method of claim 24, wherein selectively gating processing of the reference signal comprises:
   gating processing of the reference signal completely for an occurrence of the reference signal associated with the time instance at which the reference signal is expected based at least in part on detecting that the reference signal is not present in the frequency domain in at least one sub-band of the plurality of sub-bands.

26. The method of claim 24, wherein selectively gating processing of the reference signal comprises:
   processing the reference signal using portions of the reference signal in one or more sub-bands in which the reference signal is present in the frequency domain based at least in part on detecting that the reference signal is not present in the frequency domain in at least one sub-band of the plurality of sub-bands.

27. The method of claim 20, wherein detecting whether the reference signal is present in the channel comprises:
   detecting whether the reference signal is present in the channel in a time domain at the time instance at which the reference signal is expected; and
   detecting, based at least in part on a determination that the reference signal is present in the channel in the time domain, whether the reference signal is present in a frequency domain in each of a plurality of sub-bands in the channel.

28. The method of claim 20, wherein selectively gating processing of the reference signal comprises gating processing of the reference signal for an occurrence of the reference signal associated with the time instance at which the reference signal is expected when the reference signal is not present in the channel, and wherein gating processing of the reference signal comprises:
   preventing, for a filter having a filter value that is based at least in part on processing the reference signal, a current value of the filter value from changing based on processing the occurrence of the reference signal associated with the time instance at which the reference signal is expected.

29. A non-transitory computer-readable medium storing a set of instructions for wireless communication, the set of instructions comprising:
   one or more instructions that, when executed by one or more processors of a user equipment (UE), cause the UE to:
      detect whether a reference signal is present in a channel at a time instance at which the reference signal is expected; and
      selectively gate processing of the reference signal based on whether the reference signal is present in the channel, wherein selectively gate processing of the reference signal when the reference signal is not detected in the channel comprises gating reporting of an estimate of the channel based on the reference signal.

30. An apparatus for wireless communication, comprising:
   means for detecting whether a reference signal is present in a channel at a time instance at which the reference signal is expected; and
   means for selectively gating processing of the reference signal based on whether the reference signal is present in the channel, wherein selectively gate processing of the reference signal when the reference signal is not detected in the channel comprises gating reporting of an estimate of the channel based on the reference signal.

* * * * *